United States Patent
Adams

[15] 3,655,206
[45] Apr. 11, 1972

[54] MULTILAYER GRAPHITE SEAL RING

[72] Inventor: William V. Adams, Kalamazoo, Mich.

[73] Assignee: Durametallic Corporation, Kalamazoo, Mich.

[22] Filed: June 27, 1969

[21] Appl. No.: 837,061

[52] U.S. Cl. ................................................277/87, 277/93
[51] Int. Cl. ..................................................F16j 15/38
[58] Field of Search ....................277/84, 91, 93, 93 SD, 190, 277/191, 203, 237 MD

[56] References Cited

UNITED STATES PATENTS

| | | | |
|---|---|---|---|
| 2,423,436 | 7/1947 | Blom | 277/93 X |
| 2,951,719 | 9/1960 | Porges | 277/91 X |
| 3,025,070 | 3/1962 | Copes | 277/93 X |
| 3,160,416 | 12/1964 | Ryffel | 277/203 X |

Primary Examiner—Laverne D. Geiger
Assistant Examiner—Edward J. Earls
Attorney—Woodhams, Blanchard and Flynn

[57] ABSTRACT

An improved seal ring construction for use between a pair of relatively nonrotatable elements of a shaft seal assembly. An annular sealing ring is constructed of a multilayer graphite material and has one axial end face thereof in bearing engagement with a support surface formed on one of the elements, which support surface is substantially transverse to the axial direction of the sealing ring. The other axial end face of the sealing ring bears against an annular control member, which in turn bears against the other element. A wedge-shaped portion contacts one corner of the sealing ring to apply a radially inward and axial compressive force thereto.

14 Claims, 8 Drawing Figures

INVENTOR.
WILLIAM V. ADAMS
BY
ATTORNEYS

Patented April 11, 1972

INVENTOR.
WILLIAM V. ADAMS
BY
Woodhams, Blanchard & Flynn
ATTORNEYS

MULTILAYER GRAPHITE SEAL RING

FIELD OF THE INVENTION

This invention relates to an improved seal ring construction and, in particular, relates to the shaft seal for a mechanical sealing device, said shaft seal being constructed from multilayer or laminated graphite material for use in high or low temperature, highly corrosive and/or radioactive environments or combination thereof.

BACKGROUND OF THE INVENTION

In the design of mechanical sealing devices for a wide variety of uses, such as in pumps, autoclaves, mixers and other industrial processing equipment, a great amount of progress has been made in enhancing the applicability of such devices to a wide range of use conditions. However, a portion of such devices known as the "shaft seal" has in many instances over a long period of time been the feature limiting the use of such devices over a still wider area of use. Thus, the seal industry has long searched for a more nearly universal but still effective shaft seal.

More particularly, shaft seals have been developed which can successfully withstand chemical attack and deterioration when used with various chemicals, if utilized within moderate temperature ranges, but there still exists a great and long felt need for a shaft seal which is capable of successfully operating for sustained periods of time at extremely high or extremely low temperatures, with the shaft seal additionally being able to withstand substantially high levels of radiation. To the best of my knowledge, prior to the present invention, no shaft seal has existed capable of operating under these extreme conditions. For example, there has long existed a need for a shaft seal capable of successfully operating for sustained periods of time at extremely high temperatures, particularly when the shaft seal is maintained at a temperature in excess of 600° F. Also, the increased activity in the field of cryogenics has resulted in a great need for a shaft seal capable of successfully operating for sustained periods of time at extremely low temperatures, such as temperatures below −100° F.

The increased utilization of nuclear reactors, nuclear power plants and other systems involving the handling of radiation-producing substances has also resulted in a great need for a shaft seal capable of withstanding substantially high levels of radiation without undergoing physical or chemical deterioration. None of the prior known shaft seals have, to the best of my knowledge, been able to successfully operate for sustained periods of time at the relatively high radiation levels encountered on nuclear power plants. The problem is further complicated by the fact that the fluids utilized in nuclear power plants are generally at high temperatures which, in combination with the relatively high radiation levels, results in rapid failure of conventional shaft seals.

Most shaft seals are, and have been for upwards of 30 years, constructed of elastomers, such as natural or synthetic rubbers. While the use of such elastomers results in a desirable resilient shaft seal, most elastomers have relatively low resistance to at least some chemicals and thus rapidly deteriorate when utilized in environments wherein the elastomers are exposed to harmful chemicals. Further, even when used with nonharmful products or liquids, shaft seals constructed of elastomers are still of limited usability since they maintain their elasticity and sealing characteristics only if used within a moderate temperature range. It has been found that shaft seals constructed of elastomers are generally not successfully usable with any degree of reliability when the seal temperature exceeds 500° F. since even the best elastomers often rapidly deteriorate when exposed to such a high temperature. Further, many otherwise desirable elastomers have an upper usable temperature limit of only approximately 200° to 250° F.

Shaft seals constructed of elastomers also often have a minimum useful temperature of approximately −65° F. since the elastomers tend to harden excessively when exposed to temperatures in the neighborhood of −65° F. The elastomers thus lose their resiliency and are incapable of effectively functioning as a shaft seal. Thus, shaft seals constructed of elastomers are generally usable only within a temperature range of no greater than about −65° to 500° F. and often less.

It has also been discovered that shaft seals constructed of elastomers are not usable in radioactive environments since elastomers chemically deteriorate when exposed to even moderate levels of radiation. The elastomers most capable of withstanding substantial radiation without chemical deterioration are the polyurethane rubbers which, under dynamic conditions, begin to chemically deteriorate when exposed to a gamma radiation level of approximately $1 \times 10^{10}$ ergs per gram. However, polyurethane rubbers are able to withstand this radiation level only when subjected to temperatures less than 200° F. since they become unstable above this temperature.

Shaft seals are also often constructed from asbestos compositions. While asbestos shaft sealing compositions can be successfully utilized at relative low temperatures, use of asbestos composition shaft seals at higher temperatures has proven unsuccessful since the rate of deterioration increases as the temperature increases. Further, at temperatures of approximately 600° F. and above, the asbestos composition seal becomes extremely hard and has only a short useful life. This tendency of an asbestos composition seal to become hard also results in the seal functioning as an abrasive cutting member, whereupon the surrounding elements of the seal assembly become cut or abraded, thereby causing damage to the seal assembly and resulting in seal leakage. The usefulness of asbestos compositions is further severely limited in that asbestos compositions can only be used in certain geometric forms, and thus are not readily usable when it is desired to use a shaft seal of a specific configuration, such as a V-shaped shaft seal. Thus, asbestos compositions have at least only limited usability as shaft seals.

Many shaft seals are presently constructed of resilient synthetic plastics, particularly polytetrafluoroethylene, commonly referred to as Teflon (trademark). Teflon is probably the most universally used shaft sealing material at the present time as it exhibits almost universal chemical resistance and thus can be utilized in seal assemblies for chemical and petroleum products. Teflon is chemically attacked only by alkali metals and halogens at elevated temperatures in excess of 200° F. However, Teflon becomes amorphous above 621° F., and thus shaft seals constructed of Teflon generally have a maximum useful operating temperature of approximately 550° F., being used occasionally at temperatures as high as 600° F. Teflon is thus superior to the natural and synthetic rubbers since it can be utilized at temperatures up to a maximum of 600° F., whereas most rubbers can be utilized only to maximum temperatures of approximately 500° F.

While Teflon exhibits better high temperature operating characteristics, it has been determined that Teflon has low temperature characteristics substantially corresponding to those of shaft seals constructed from conventional elastomers, such as natural and synthetic rubbers. In particular, shaft seals constructed of Teflon generally have a useful minimum operating temperature of approximately −65° F., occasionally being used at temperatures as low as −100° F. However, at temperatures as low as −100° F., Teflon shaft seals exhibit a substantial amount of shrinkage, thereby preventing the Teflon shaft seal from creating an effective seal and thus resulting in leakage.

The use of Teflon shaft seals at extremely high or extremely low temperatures is further complicated by the fact that Teflon has a coefficient of thermal expansion approximately 10 times that of steel and thus undergoes relatively large volume changes when used at extremely high or extremely low temperatures. This thus results in somewhat erratic sealing properties. Further, Teflon, like other elastomers, is not usable in radioactive environments since shaft seals constructed of Teflon chemically deteriorate when exposed to even moderate levels of radiation. Shaft seals constructed of Teflon have thus proven entirely unsatisfactory for use in radioactive environments, such as in nuclear reactors and nuclear power plants.

Further, Teflon, like other elastomers, causes fretting and thus often creates serious corrosion or contamination problems when used with chemicals and petroleum products.

As indicated above, conventional shaft seals, the majority of which are constructed of elastomers, including Teflon, have been unable to successfully operate for any substantial period of time in environments wherein the shaft seals are subjected to temperatures above 600° F. or below −100° F., and/or wherein the shaft seals are exposed to substantial radiation, such as in excess of $1 \times 10^{10}$ ergs per gram. Accordingly, at the present time, in environmental situations wherein one or more of the above-mentioned conditions exist, a metallic bellows is generally utilized since none of the other types of shaft seals known prior to the present invention have been able to operate sucessfully.

Metal bellows can be successfully utilized at temperatures as high as 1,200° F. and as low as −400° F. Metal bellows can also obviously withstand exposure to substantial levels of radiation without undergoing any chemical or physical deterioration. Thus, metal bellows are presently utilized in those situations involving extremely high or extremely low temperatures, and/or exposure to substantial levels of radiation.

However, substitution of a metal bellows for a shaft seal in the above-mentioned environmental situations has not proven entirely satisfactory or desirable. In particular, a bellows has many well known disadvantages which makes its use undesirable. For example, the manufacture of a metal bellows is time consuming and expensive since the individual bellows plates must be securely welded together around the complete peripheral edges thereof to produce a fluid tight joint while at the same time permitting the bellows to have the desired flexibility. This manufacturing procedure results in the finished bellows being undesirably, and in some situations prohibitively, expensive. Further, a bellows, in comparison to a sealing ring, is bulky and space consuming and thus occupies a substantially greater space than a conventional sealing ring. The bulky construction of a bellows further makes the design of the overall seal assembly and of the related apparatus more difficult.

The most serious disadvantage of utilizing a bellows, particularly when the bellows is being utilized in a radioactive environment or is handling fluids of extremely high or extremely low temperature, is the problem of metal fatigue. As is well known, bellows have long been subjected to failure due to metal fatigue caused by the continuous cyclic forces imposed on the bellows during operation. The continuous flexing or cycling of the bellows often results in a failure or breakage of the bellows at one of the welded joints, which failure may occur after only a relatively short period of operation. Further, even if no such failure occurs, it is generally necessary to change the bellows after limited periods of operation in order to safely avoid the problem of fatigue failure. The problem of bellows failure, as caused by metal fatigue, is obviously highly undesirable since such failure often permits very harmful fluids to escape from the apparatus.

Further, the fatigue problem associated with metal bellows necessarily requires a shut-down of the complete apparatus to permit replacement of a bellows. This is obviously undesirable, being both time consuming and expensive. Thus, while metal bellows have permitted seal assemblies to successfully operate, at least for limited periods of time, in environmental situations where conventional shaft seals were not previously usable, the use of a bellows in these situations has at best represented a temporary solution to the problem since the use of bellows necessarily results in many other disadvantages, as explained above, which make their use undesirable.

The present invention relates to an improved shaft seal assembly having a multilayer or laminated carbon shaft seal therein, which shaft seal cooperates with a tapered compression member for permitting the shaft seal to be utilized in environmental conditions previously considered too severe for prior known shaft seals. In particular, the shaft seal of this invention is usable in situations which previously required the use of metal bellows, which bellows are undesirable as explained above.

Specifically, the shaft seal of this invention comprises a sealing ring constructed of multilayer or laminated graphite, the multilayer structure of which is produced by using a plurality of thin washer-like plates or a continuous flat member wound in helix, the resultant multilayer sealing ring being compressed between a pair of supporting surfaces. The multilayer or laminated graphite sealing ring according to the present invention can be successfully utilized in oxidizing environments at temperatures as high as 750° to 800° F., and is usable at temperatures as high as 3,000° F. when in a neutral or nonoxidizing atmosphere. Further, the graphite sealing ring according to the present invention has been successfully utilized at temperatures as low as −320° F., and it is expected that a shaft sealing ring according to the present invention can be safely used at temperatures substantially below this value. The multilayer graphite sealing ring according to the present invention also remains stable when exposed to a gamma radiation of at least $10 \times 10^{10}$ ergs per gram, which value represents the maximum radiation level experimentally imposed on this sealing ring. While the maximum radiation limit has not yet been determined, it is expected that the sealing ring according to this invention will be able to withstand a maximum radiation level substantially in excess of this value without effecting its physical properties. Thus, it is apparent that the shaft seal according to the present invention greatly extends the usable environmental range of seal assemblies containing shaft seals therein, thereby permitting shaft seal assemblies containing such shaft seals to be utilized in many situations which previously required the use of undesirable metal bellows.

The shaft seal according to the present invention is preferably constructed of a multilayer or laminated graphite which is sold under the name of Grafoil (trademark). Such laminated Grafoil has been suggested for use as a packing ring for pump stuffing boxes. However, as is well known, packing rings for stuffing boxes are generally designed to have a controlled minimum leakage therepast in order to provide for flow of lubricant to related elements or parts, such as between the relatively rotating packing ring and pump shaft to prevent scoring and overheating. Further, in such dynamic environments, the packing ring is normally subjected to a relatively large initial axial compression force. In such environments, it was discovered that Grafoil was satisfactory as a packing material since it permitted the desired leakage.

Due to the leakage past dynamically loaded Grafoil packing rings, even when subjected to relatively large compression loads, it was felt that Grafoil could not be satisfactory utilized for shaft seals in rotating seal assemblies of the type disclosed herein since such shaft seals are normally subjected to only relatively light compressive loads as the design of the seal assembly does not permit imposition of large axial compressive loads on the shaft seals. Thus, since Grafoil packing rings exhibited substantial leakage when utilized in a dynamic environment, as in a stuffing box, and when subjected to large compressive loads, it was felt that Grafoil could not be successfully utilized as a shaft seal due to the relatively light compressive loads and continuous movement normally encountered in rotating seal assemblies.

Further, rotating seal assemblies are generally designed so as to have substantially no (or relatively insignificant) leakage, the amount of leakage permissible in a rotating seal assembly being substantially less than the desired controlled leakage past a stuffing box packing ring. Thus, the substantial leakage past a Grafoil packing ring thus indicated to those skilled in the art that the use of Grafoil as a shaft seal for a rotating seal assembly would result in even increased leakage therepast.

In actual tests constructed on rotating sealing assemblies utilizing shaft seals of conventional configuration constructed from Grafoil, that is, wherein the Grafoil shaft seal was compressed between two substantially planar surfaces, it was experimentally observed that the Grafoil shaft seal exhibited substantial amounts of leakage, thereby indicating that substituting Grafoil for other conventional shaft seal materials did not result in a successful seal assembly. Specifically, it was found that leakage occurred along the shaft and that the axial loading from the spring and hydraulic forces were not sufficient to cause radial expansion of the Grafoil shaft seal into tight sealing engagement with the shaft.

Further, Grafoil is fragile and brittle, and thus it was felt that same would not possess the necessary strength and resiliency to successfully operate in a rotating seal assembly. However, due to a drastic need for a seal material which would operate at high and low temperatures and in radioactive environments, Grafoil was tried as a shaft seal material and, as stated above, the initial experimental attempts to utilize the material between the two planar surfaces resulted in undesirable leakage. Further, physical installation of the Grafoil shaft seal between the two substantially planar surfaces often resulted in breakage of the brittle seal ring.

After the above-mentioned unsuccessful attempts to utilize a Grafoil shaft seal between two substantially parallel supporting surfaces, some consideration was given to the use of a wedge for causing the Grafoil shaft seal to be compressed into sealing engagement with the shaft. However, it was felt that use of such a wedge would be unsuccessful since the brittleness of the material, together with its formulation in thin layers, would result in a cracking or breaking of the individual layers of the material when a radial force was imposed thereon by a wedge. Further, the individual layers of Grafoil comprise a plurality of flakes compressed together, and thus it was felt that a radial wedge would cause a crumbling or breaking apart of the flakes, and consequent complete structural breakdown of the Grafoil shaft seal.

Nevertheless, due to the desperate need for a more universal shaft seal, further tests were conducted on Grafoil shaft seals used in combination with a pure wedge for causing a radially inward compression of at least a portion of the Grafoil shaft seal so as to cause same to be moved into tight sealing engagement with the surface of the shaft. As stated above, it was felt that these tests would result in breakage or cracking of the Grafoil shaft seals and result in large and undesirable seal leakage. However, the experimental results obtained from these tests revealed that these seal assemblies utilizing a pure wedge did initially operate and properly seal. Upon further testing, it was observed that these seal assemblies broke down and tended to leak after being operated continuously for a few days. Upon disassembly, it was observed that the leakage and seal breakdown was due to a delamination and breakup of the graphite beneath the wedge and adjacent the shaft surface.

Accordingly, attempts were then made to utilize a seal assembly wherein an adapter or control member was used for compressing the Grafoil shaft seal, which adapter was provided with a wedge surface thereon and was also provided with a substantially transverse support surface continuous with and interconnected to the wedge surface. Experimental tests on this type of seal assembly revealed that the adapter was able to compress the shaft seal into tight sealing engagement with periphery of the shaft while preventing a delamination or breakup of the graphite, whereby the shaft seal was able to operate satisfactorily and perform a desirable sealing function for long periods of operation. The adapter thus substantially eliminated the problem of leakage past the Grafoil shaft seal. Thus, the latter described tests produced results which were entirely unexpected and, in fact, contrary to the expected results.

Accordingly, it is an object of this invention to provide a shaft seal assembly having an improved sealing ring structure therein for permitting successful utilization of the seal assembly at extremely high and extremely low temperatures, particularly above 600° F. and below −100° F., respectively, with the seal assembly further being successfully usable in radioactive environments.

It is also an object of this invention to provide a shaft seal assembly, as aforesaid, wherein the shaft seal is constructed of multilayer or laminated graphite material.

A further object of the present invention is to provide a seal assembly, as aforesaid, wherein the graphite shaft seal is compressed between two substantially transverse and parallel supporting surfaces.

It is a further object of this invention to provide a seal assembly, as aforesaid, wherein a compression member coacts with the graphite shaft seal and has a wedge-shaped portion which coacts with at least one radially outer corner of the shaft seal for simultaneously applying radially inwardly and axially directed compressive forces thereto.

Another object of the present invention is to provide a seal assembly, as aforesaid, wherein the multilayer or laminated construction of the graphite shaft seal is achieved by utilizing either a plurality of thin washer-like plates or a continuous flat member wound in a helix.

A still further object of the present invention is to provide a seal assembly, as aforesaid, wherein the graphite shaft seal can successfully operate for substantial periods of time (1) at temperatures in excess of 600° F., (2) at temperatures below −100° F., and (3) in environments having a radiation level in excess of $1 \times 10^{10}$ ergs per gram.

The present invention also has for one of its objects the provision of an improved sealing assembly utilizing a shaft seal therein which can withstand the above-mentioned environmental operating conditions with the shaft seal occupying a minimum of space and being relatively inexpensive to manufacture, install and maintain.

Other objects and purposes of this invention will be apparent to persons acquainted with devices of this type upon reading the following specification and inspecting the accompanying drawings.

Figure 1:
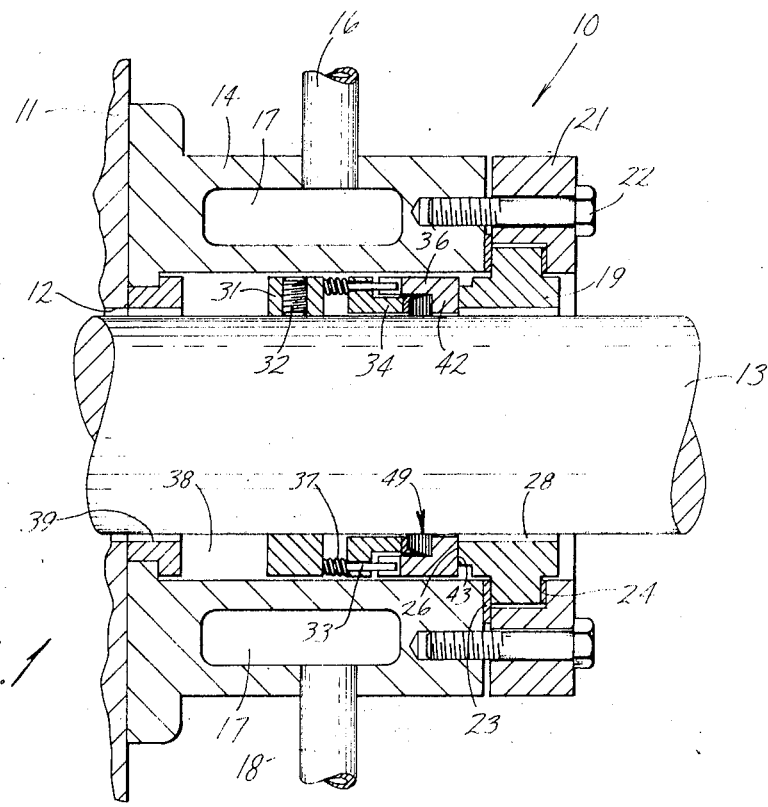
FIG. 1 is a central sectional view of a mechanical seal assembly employing therein a preferred embodiment of a shaft seal constructed according to the present invention.

Certain terminology will be used in the following description for convenience and reference only and will not be limiting. The words "upwardly", "downwardly", "leftwardly" and "rightwardly" will designate directions in the drawings to which reference is made. The words "inwardly" and "outwardly" will refer to directions toward and away from, respectively, the geometric center of the device and designated parts thereof. Said terminology will include the words above specifically mentioned, derivatives thereof and words of similar import.

Further, the terminology "multilayer" as utilized herein includes not only an annular shaft seal (hereinafter referred to as the "sealing ring") constructed from a plurality of individual plate-like members axially stacked together, but also a continuous flat member wound so as to form either a helical or a concentric spiral. Further, the individual layers of the sealing ring may become at least partially bonded together when a compression force is applied thereto.

SUMMARY OF THE INVENTION

In general, the objects and purposes of the invention are met by providing a mechanical seal construction for use between a wall and a shaft extending through and rotatable relative thereto, and wherein the mechanical seal construction has a pair of sealing members having mutually contacting sealing faces. One of the sealing members is fixed with respect to the wall whereas the other sealing member is capable of rotation in response to rotation of the shaft. This invention relates to an improved sealing structure associated with one of said sealing members, said one sealing member comprising first and second elements mounted for axial movement with respect to each other and/or to the shaft and having said improved sealing structure confined therebetween. The sealing structure comprises a multilayer or laminated graphite sealing ring encircling the shaft and having one axial end face disposed in compressive engagement with a substantially transverse support surface formed on one of the elements. An annular control member bears against the other axial end face of the graphite sealing ring, and is maintained in compressive engagement with the sealing ring by means of the other element.

In a preferred embodiment of the invention, the control member is preferably cup-shaped and has a wedge-shaped flange around the periphery thereof which contacts the outer corner of the graphite sealing ring and applies radially inward and axially directed compressive forces thereto. The support surfaces adjacent the opposite axial ends of the sealing ring are preferably substantially transverse to the axis of the shaft, deviating at most from the desired transverse relationship by an angle of no more than 10°. Further, the wedge-shaped flange portion preferably has an angle of approximately 15° relative to the shaft axis, the wedge-shaped angle preferably lying within the range of between 5° and 25°. The layered graphite also preferably has an initial density within the range of between 35 and 70 pounds per cubic foot so as to result in the desired resiliency and sealing characteristics, which material undergoes limited compression during installation so as to have an installed density of between approximately 40 and 90 pounds per cubic foot.

DETAILED DESCRIPTION

FIG. 1 illustrates therein a typical seal assembly 10 having associated therewith an improved sealing structure according to the present invention. The seal assembly disclosed in FIG. 1 is commonly referred to as an "inside" type and is associated with an apparatus which includes a wall 11 having an opening 12 through which extends a rotatable shaft 13.

The seal assembly 10 includes a housing 14 secured to the wall 11 by conventional means, such as bolts (not shown) and has an inlet 16 connected to annular passageway 17 extending around the shaft 13. The housing 14 is further provided with an outlet 18 connected to the passageway 17 to permit the egress of a cooling fluid introduced to the passageway 17 through the inlet opening 16 by pumping means (not shown).

The mechanical seal assembly 10 (FIGS. 1 and 2) comprises a stationary annular seal member 19 encircling the shaft 13. In the illustrated embodiment, the annular seal member 19 is a gland insert which is mounted in a gland 21. The gland 21 is secured to the housing 14 by conventional means, such as bolts 22, and suitable sealing means 23 and 24, such as gaskets, are provided between the annular sealing member 19 and the gland 21 and the housing 14. The gland insert 19 has an axially extending projection which projects into the housing 14, the inner axial end of which has an accurately finished radial seal surface 26 thereon. The gland insert 19 can be made of any suitable material, such as carbon. The sealing member 19 is thus nonrotatably secured relative to the gland 21 and is radially spaced from the rotatable shaft 13 to define an annular clearance space 28 therebetween.

A collar 31 encircles and is fixedly secured to the shaft 13 by suitable means, such as one or more set screws 32. The collar 31 has a plurality of drive pins 33, of which two appears in FIG. 1, extending axially therefrom into suitable openings 35 (FIG. 2) in an annular compression ring 34. The compression ring 34 is urged toward a cup-shaped sealing member 36, in part mechanically by any convenient known means, here indicated by a plurality of springs 37 which are compressed between the collar 31 and the ring 34, and in part by fluid pressure entering the chamber 38 through the clearance space 39. The plurality of drive pins 33 pass through the ring 34 and extend into slots 41 formed in the adjacent axial end of the annular sealing member 36. The rings 34 and 36 are thus nonrotatably secured relative to the shaft 13. However, the rings 34 and 36 are both axially movable relative to one another and relative to the shaft 13.

The rotating sealing member 36 (FIG. 2) has an annular base portion 42 provided with an accurately finished radial seal surface 43 on an axial end thereof. The rotating sealing member 36 is urged against the nonrotating seal member 19 whereby the sealing surface 43 is urged against the sealing surface 26 to form a sliding seal therebetween. A clearance 44 is provided between the rotating sealing member 36 and the shaft 13 to provide a slightly floating relationship between the rotating sealing member 36 and the shaft 13 for the known purpose of maintaining alignment between the two sealing members 19 and 36. The clearances 28 and 44 define a chamber into which a coolant can be introduced for cooling the seal assembly if desired. Means for introducing coolant into the clearance chamber is described in detail in copending application, Ser. No. 637 506, filed May 10, 1967, now U.S. Pat. No. 3,467,396.

The rotating sealing member 36 is further provided with an annular sleeve portion 46 which surrounds and is spaced from the shaft 13 so as to define an annular clearance space 47 therebetween, in which space is positioned the improved shaft sealing structure 49 according to the present invention. The sealing structure 49 positioned within the annular space 47 is axially confined between the base portion 42 and the axially extending sleeve portion 48 of the ring compression 34.

Considering now the shaft sealing assembly 49, same comprises an annular sealing ring 51 together with a control member or adapter 52 positioned between a pair of support surfaces 53 and 54 formed on the rings 36 and 34, respectively. The sealing ring 51 is of a multilayer, laminated construction and is preferably formed from a plurality of thin washer-like plates 56 of graphite (FIG. 3), which plates are axially stacked together. The individual graphite plates 56 preferably have an axial thickness of approximately 0.005 to 0.010 inches. Alternately, rather than utilizing a plurality of individual plates 56 as disclosed in FIG. 3, the sealing ring 51 can be formed from a continuous flat member wound in a helix so as to form an axially extending spiral member 57 (FIG. 4), the axial thickness of the individual flights of the spiral member corresponding to the axial thickness of the individual plates 56 illustrated in FIG. 3. As still a further alternate, the sealing ring 51 can be formed from a continuous flat member wound radially so as to form a concentric spiral member 60 (FIG. 5), the axial width of the individual coils of the spiral member 60 corresponding to the axial length of the sealing ring 51.

The one axial end of the graphite sealing ring 51 is maintained in sealing engagement with the support surface 53 by means of the control member 52, which member in the preferred embodiment is of a cup-shaped configuration and has an annular base portion 58 together with a wedge-shaped sidewall portion 59 which surrounds and contacts one radially outer end of the sealing ring 51 so as to apply an inwardly and axially directed compressive force thereto, which compressive force results in the sealing ring 51 being tightly compressed against the surface of the shaft 13 at the same time it is urged against the support surface 53. The base portion 58 also has a support surface 61 thereon opposite and spaced from the surface 53 for confining the sealing ring 51 therebetween. The control member 52 is itself contacted by the extending sleeve portion 48 of the compression ring 34 whereby the sealing ring 51 and control ring 52 are tightly compressed between the support surfaces 53 and 54.

The shaft seal 51, as explained above, is of a graphite material and preferably of a multilayer or laminated graphite material sold under the name "Grafoil" (trademark). It has been experimentally discovered that a successful seal can be achieved if the graphite has an initial density of between 35 and 70 pounds per cubic foot. After the graphite sealing ring 51 has been installed within the seal assembly and compressed between the surfaces 53 and 54, the sealing ring undergoes limited compression so that the actual density of the sealing ring 51 when installed is approximately between 40 and 90 pounds per cubic foot. While graphite material having a density less than 35 pounds per cubic foot can be initially utilized, such low density material requires substantial compression during installation in order to achieve a tight seal, and thus use of such low density material is not preferred. Further, the use of graphite having an initial density greater than 70 pounds per cubic foot is not preferred since the stiffness of the material normally prevents the material from being compressed sufficiently to permit same to be moved into tight sealing engagement with the shaft, thereby not resulting in a fluid tight seal.

The graphite or Grafoil material preferably has a tensile strength in a direction parallel to the individual layers of approximately 1,000 p.s.i. and a compressive strength in a direction normal to the individual layers of approximately 600 p.s.i. while resulting in approximately a 10 percent reduction in thickness, the material having an ultimate compressive strength of approximately 12,000 p.s.i. The material further has a flexural strength in a direction parallel to the individual layers of approximately 1,300 p.s.i.

It has also been experimentally determined that the multilayer sealing ring 51 achieves a fluid tight sealing relationship with the shaft 13 and the support surface 53 only if a wedge-shaped actuating member, such as the wedge portion 59, is used for compressing the graphite ring. In a preferred embodiment of the invention, the control member 52 is provided with the wedge-shaped portion 59 thereon. The wedge-shaped portion 59 (FIG. 6) has a wedge contact surface 62 thereon which extends at an angle $\alpha$ relative to the axial direction of the shaft 13, which angle $\alpha$ preferably lies within the range of 5° and 25°, preferably being approximately 15°.

Figure 6:
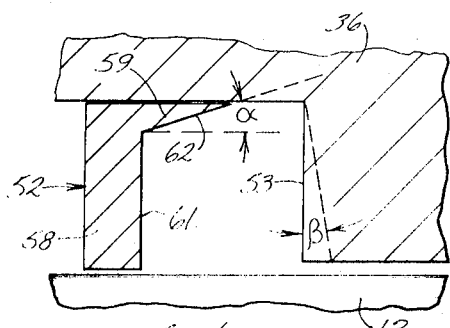
FIG. 6 is an enlarged fragmentary view illustrating in cross section the relationship of the adjacent supporting surfaces.

A tight sealing engagement of the sealing ring 51 with the shaft 13 and support surface 53 is further provided only if the support surfaces 53 and 61 formed on the sealing ring 36 and control member 52, respectively, are substantially parallel to one another and are each substantially transverse to the shaft axis. The support surface 53, as illustrated in FIG. 6, can deviate slightly from the desired transverse relationship as indicated by the angle $\beta$ in FIG. 6, whereupon the support surface 53 assumes a conical shape which converges in a direction away from the control ring 52. Forming the surface 53 substantially transverse to the shaft axis (that is, angle $\beta$ equal to zero) is preferred since this results in the minimum seal leakage. However, it has been experimentally determined that an acceptable sealing relationship is also obtained if the angle $\beta$ does not exceed approximately 10°, and preferably does not exceed 5°.

OPERATION AND INSTALLATION

The installation and operation of the present invention will be briefly described to ensure a complete understanding thereof.

Figure 3:
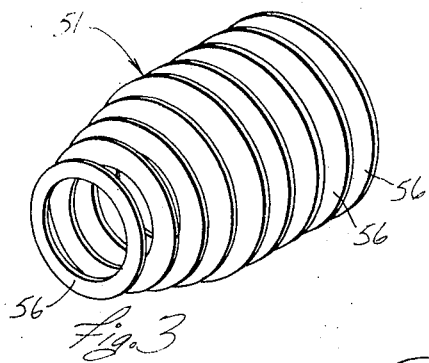
FIG. 3 is an enlarged, exploded isometric view illustrating one method of manufacturing the multilayer or laminated shaft seal.
Figure 4:
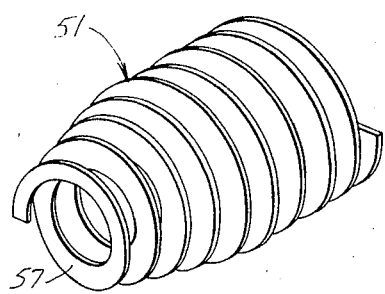
FIG. 4 is an enlarged, exploded isometric view illustrating a further method of making the shaft seal.

The multilayer, laminated graphite sealing ring 51 according to the present invention is initially formed by utilizing either a plurality of thin plate-like members 56 as illustrated in FIG. 3 or by utilizing a continuous spiral member 57 as illustrated in FIG. 4. The graphite material used for forming the sealing ring 51 will, prior to installation within the seal assembly 10, preferably have an initial density of between 35 and 70 pounds per cubic foot.

The multilayer, laminated sealing ring 51 will be positioned within the annular space 47 so that one axial end thereof abuts against the support surface 53. The control ring 52 will also be positioned within the space 47 so as to bear against the other end of the sealing ring 51, the ring 34 then being urged toward the sealing ring 36 so that the support surface 54 will contact the control ring 52 and cause same to be urged into engagement with the sealing ring 51, whereupon the sealing ring 51 will be tightly compressed between the surfaces 53 and 61. Movement of control member 52 into engagement with sealing member 51 also causes the wedge portion 59 to contact the outer corner of the sealing ring 51 whereupon the sealing ring 51 is compressed radially inwardly so as to move into tight sealing engagement with the periphery of shaft 13. This compression of the sealing ring 51 results in an increase in the density of the graphite material, the amount of density increase being dependent upon the initial density of the material and the magnitude of the compression force applied by the springs 37 and by the fluid contained in the chamber 38 during operation of the device.

During operation of the seal assembly, the shaft 13 will be rotated relative to the wall 11 and a pressurized fluid will be contained within the chamber 38. To prevent the pressurized fluid from escaping from the chamber 38, a seal is provided by the contact between the relatively rotating seal faces 26 and 43 formed on the stationary and rotating seal members 19 and 36, respectively. To prevent pressurized fluid in chamber 38 from escaping along the surface of the shaft, the shaft sealing structure 49 is provided, which sealing structure is compressed into sealing engagement with both the periphery of the shaft 13 and the support surface 53 formed on the rotating seal ring 36. The sealing structure 49, which includes the sealing ring 51 and the control ring 52, is tightly compressed between the ring members 34 and 36, both of which rotate with the shaft 13 so that the sealing structure 49 likewise rotates with the shaft 13. The sealing ring 51 thus effectively prevents fluid leakage along the periphery of the shaft 13 or along the internal surface of the sealing member 36. The multilayer graphite sealing ring 51, as activated by the wedge portion 59, possesses sufficient resiliency to maintain a tight sealing relationship with the support surface 53 and the surface of the shaft 13, even when the sealing member 36 moves angularly or floats relative to the shaft 13 during operation of the seal assembly, which angular or floating movement of the sealing ring 36 is necessary so as to maintain a tight slideable sealing relationship between the faces 26 and 43.

MODIFICATIONS

Figure 2:
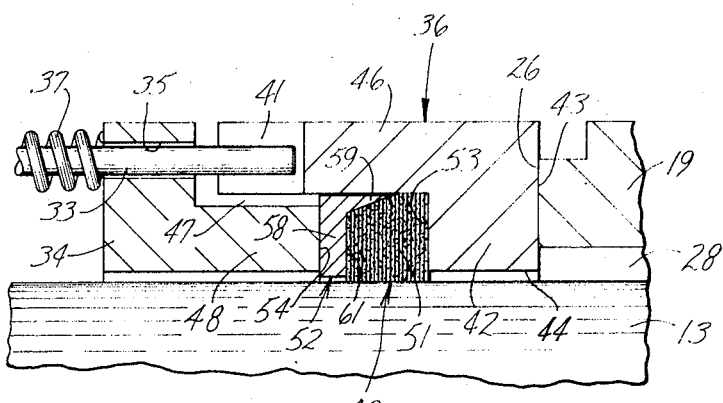
FIG. 2 is an enlarged fragmentary sectional view of a portion of FIG. 1 and specifically illustrating the improved laminated shaft seal of the present invention.
Figure 7:
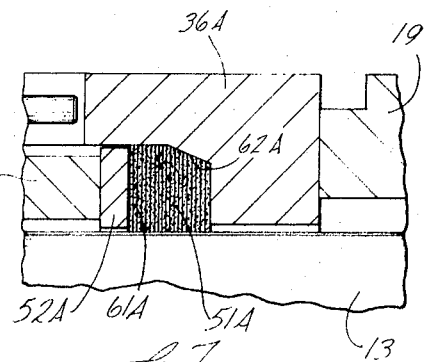
FIG. 7 is a fragmentary sectional view similar to FIG. 2 and illustrating a modification of the present invention.

FIG. 7 illustrates therein a modification of the present invention, which modification is structurally similar to the embodiment illustrated in FIG. 2 and operates in substantially the same manner. In particular, in FIG. 7, the control ring 52A comprises an annular plate member and is not provided with any wedge portion thereon. Rather, the rotating sealing member 36A is provided with a wedge surface 62A thereon, which wedge surface contacts the outer corner of the seal ring 51A in substantially the same manner as the wedge surface 62 illustrated in FIG. 6 so as to cause a radially inwardly directed compression of the sealing ring 51A, thereby causing same to tightly and sealingly engage the surface of the shaft 13. The embodiment disclosed in FIG. 7 is thus structurally identical to the embodiment disclosed in FIG. 2 except that the wedge actuating portion is provided on the rotating sealing ring rather than on the control member.

Figure 8:
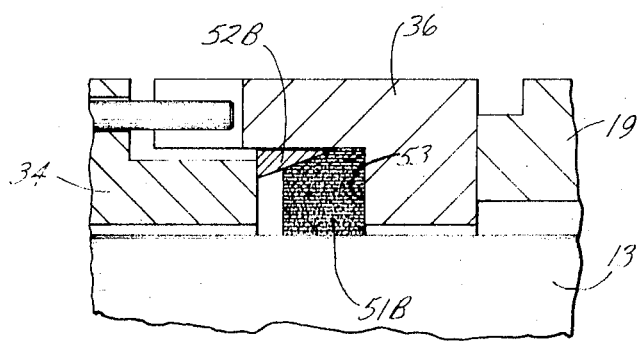
FIG. 8 is a fragmentary sectional view similar to FIG. 2 and illustrating a further modification of the present invention.

FIG. 8 illustrates a further embodiment of the present invention wherein the cup-shaped control member 52 of FIG. 2 is replaced by a control member 52B which comprises an annular wedge-shaped member 52B which again contacts the outer corner of the sealing ring 51B so as to apply a radially inwardly and axially directed compression force thereto. The control member 52B illustrated in FIG. 8 is different from the control members 52 and 52A illustrated in FIGS. 2 and 7, respectively, in that the control member 52B is not provided with an annular plate-like base portion having a transverse supporting surface thereon, such as the supporting surfaces 61 and 61A illustrated in FIGS. 6 and 7, respectively. In the embodiment illustrated in FIG. 8, the wedge-shaped member 52B not only causes radial compression of the sealing ring 51B into tight sealing engagement with the surface of shaft 13, but it also causes an axial compression of the sealing ring 51B into sealing engagement with the support surface 53.

Figure 5:
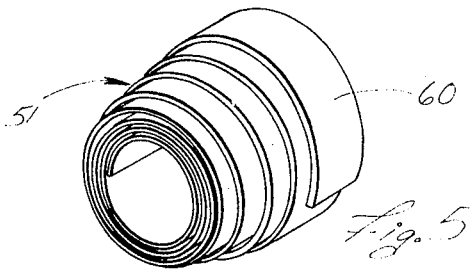
FIG. 5 is an enlarged, exploded isometric view illustrating a further method of making the shaft seal.

Use of the pure wedge-shaped control member 52B has been experimentally successful only when the multilayer sealing member 51B is constructed from concentrically wound flat graphite, such as the spiral member 60 illustrated in FIG. 5. When the sealing ring is laminated axially by being constructed from a plurality of thin plates, such as the plates 56 illustrated in FIG. 3, use of the pure wedge-shaped control member 52B does not operate satisfactorily since the sealing ring tends to delaminate and it is thus necessary to utilize a control member of the type illustrated in either FIG. 2 or FIG. 7. However, inspection of all of the embodiments illustrated in FIGS. 2, 7 and 8 readily indicates that a wedge-shaped actuating portion is present in all embodiments, which wedge-shaped actuating portion is essential to cause the multilayer laminated graphite sealing rings 51, 51A or 51B to be compressed into tight sealing engagement with the shaft 13 and the rotating seal members 36 or 36A. While the concentric spiral member 60 illustrated in FIG. 5 will function satisfactorily when utilized in a seal assembly of the type illustrated in FIGS. 2, 7 or 8, this form of sealing ring is not preferred since the radially directed laminations are more susceptible to separating or delaminating, either during assembling of the seal device, or due to the pressures imposed on the axial ends thereof by means of the pressurized fluid.

The improved sealing structure according to the present invention has thus resulted in a seal assembly which can be safely utilized for sustained periods of time in environments wherein sealing ring temperatures above 600° F. or below −100° F. are encountered. Further, the sealing ring is able to withstand substantially high levels of radiation without undergoing any physical or chemical deterioration. The improved sealing assembly according to the present invention can thus be safely and successfully utilized in many situations wherein conventional sealing rings were not previously usable, which situations previously required the use of metal bellows.

A further advantage resulting from the improved sealing ring structure of the present invention is that the laminated graphite sealing ring does not cause any fretting of the seal assembly components with which it is in contact, namely the rotating seal ring 36 and the shaft 13. As briefly indicated above, shaft seals constructed from elastomers, including Teflon, often result in a fretting action due to the small but continuous movement which occurs between the shaft seal and its contacting parts, which movement causes the oxide coating on the shaft and/or rotating seal member to be removed, whereupon the bare base metal is exposed. Thus, when the seal assembly is utilized with a corrosive fluid, such as chemicals or petroleum products, the corrosive fluid contacts the exposed base metal and causes a corrosion thereof. This fretting or corrosion problem is substantially eliminated in the present invention since the graphite shaft seal does not break or remove the oxide coating on the shaft or associated rotating seal member, and thus fretting or chemical corrosion normally does not occur.

It has also been discovered that the use of the substantially transverse support surfaces, such as the surfaces 53 and 61, result in greater seal durability and minimum seal leakage since the transverse pressure faces exert a pressure force which extends axially of the graphite seal ring 51, which pressure force acts across the grain of the individual layers, being the weakest direction, and thus the axial pressure force reinforces the graphite sealing ring to prevent a failure thereof. Further, the layered graphite sealing ring 51 in its axial direction functions as an insulator, whereas the plate-like layers substantially function as a conductor in the radial direction, the graphite plate-like layers having a thermal conductivity in the radial direction approximately 30 times larger then the thermal conductivity in the axial direction.

Although particular preferred embodiments of the invention have been described above for illustrative purposes, it will be understood that obvious or equivalent variations or modifications thereof are fully contemplated and lie within the scope of the invention.

The embodiments in which I claim an exclusive property or privilege are defined as follows:

1. In a mechanical seal construction for use between a wall and a shaft extending therethrough and rotatable relative thereto, said mechanical seal construction comprising a pair of seal elements having mutually contacting sealing faces, one seal element being fixed with respect to said wall and the other seal element being capable of rotation in response to rotation of said shaft, a further element nonrotatably interconnected to said shaft and said other seal element, said further element and said other seal element defining an annular space therebetween, sealing means positioned within said space, and means relatively urging said further element toward said other seal element to compress said sealing means into sealing engagement with said shaft and said other seal element, the improvement wherein:

said sealing means including an annular ring-like sealing member disposed within said annular space in surrounding relationship to said shaft, said annular sealing member being constructed of multilayer graphite material; and means for causing both axial and radial compression of said graphite sealing member, said means including wedge means coacting with said graphite sealing member for causing simultaneous radially inward and axial compression thereof.

2. A mechanical seal construction according to claim 1, wherein said compression means includes an annular-cup-shaped control member disposed between said multilayer graphite sealing member and said further element, said control member having a plate-like base portion having a support surface thereon in contact with one axial end of said graphite sealing member with said support surface being substantially transverse to the axis of said shaft, and said wedge means comprising an annular wedge-shaped portion secured adjacent the external edge of said plate-like base portion with said wedge-shaped portion contacting the outer edge of said graphite sealing member for applying a simultaneous radially inward and axial compression force thereto.

3. A mechanical seal construction according to claim 1, wherein said compression means includes an annular plate-like member disposed between said further element and one axial end of said graphite sealing member, said plate-like member having a support surface in contact with the one axial end of said graphite sealing member, said support surface being substantially transverse to the axis of said shaft, and said wedge means including a wedge-shaped portion formed on said other seal element for contacting an outer edge of said graphite sealing member for applying a radially inward compressive force thereto.

4. A mechanical seal construction according to claim 1, wherein said multilayer graphite material has a density of between 35 and 70 pounds per cubic foot prior to installation in the mechanical seal construction, and wherein said wedge means has a wedge surface adapted to contact one outside corner of said graphite sealing member, said wedge surface extending at an angle of between 5° and 25° relative to the axis of said shaft, and wherein said other seal element has a support surface thereon in bearing engagement with one axial end of said graphite sealing member, said support surface extending substantially transversely relative to the axis of said shaft.

5. A mechanical seal construction according to claim 4, wherein said wedge surface contacts the external periphery of said graphite sealing member over an axial length substantially less than the axial length of said sealing member.

6. A mechanical seal construction according to claim 1, wherein said multilayer sealing member is of laminated construction and includes a plurality of thin washer-like plates of graphite having a thickness of approximately 0.005 to 0.010 inch.

7. A mechanical seal construction according to claim 1, wherein said multilayer sealing member is constructed from a continuous flat member of graphite material wound in a helix with the individual flights of the helically wound member having a radial thickness substantially greater than the corresponding axial thickness.

8. An improved sealing structure for use with a shaft, comprising:
 a first support member encircling and nonrotatably secured relative to said shaft, said first support member having a first support surface thereon;
 a second support member nonrotatably secured relative to said shaft, said second support member having a second support surface thereon axially spaced from and opposed to said first support surface to define an annular space therebetween;
 a annular sealing ring disposed in said space with one axial end of said sealing ring being in abutting contact with said first support surface, said sealing ring being constructed of layered graphite material;
 an annular control ring encircling said shaft and disposed in said space with at least a portion thereof being positioned between said annular sealing ring and said second support surface, said control ring having a first contact surface disposed in abutting contact with said second support surface, and said annular control ring having a second contact surface disposed in abutting contact with said sealing ring substantially adjacent the other axial end thereof;
 annular wedge means having a conical surface extending at an angle relative to the axis of said shaft with said conical surface being adapted to contact the outer surface of said sealing ring adjacent a axial end thereof, said wedge means being fixedly interconnected to one of said first support member and said control ring; and
 means for urging said first and second support members relatively toward one another for causing axial and inward radial compression of said sealing ring due to said control ring and said wedge means, whereby said sealing ring is compressed into tight sealing engagement with the periphery of said shaft.

9. A sealing structure according to claim 8, wherein said first and second support surfaces are each substantially transverse to the axis of said shaft, and wherein said wedge means comprises an annular wedge-shaped member fixedly interconnected to said control ring, the conical surface of said wedge-shaped member being adapted to contact the outer periphery of said layered sealing ring adjacent said other axial end thereof.

10. A sealing structure according to claim 8, wherein said control ring includes an annular plate-like member disposed between said second support surface and said other axial end of said sealing ring, said plate-like member having said first and second contact surfaces on opposite sides thereof with said second contact surface being substantially transverse to the axis of said shaft and being in bearing engagement with said other axial end of said sealing ring, and wherein said first support surface formed on said first support member is substantially transverse to the axis of said shaft.

11. A sealing structure according to claim 10, wherein said wedge means includes an annular wedge-shaped member fixedly connected to said annular plate-like member adjacent the outer peripheral edge thereof with said wedge-shaped member extending toward and at least partially surrounding said sealing ring and being in contact with the outer periphery thereof adjacent said other axial end.

12. A sealing structure according to claim 10, wherein said annular wedge-shaped member is integrally formed on said first support member and extends toward and partially encircles and contacts the outer periphery of said sealing ring adjacent said one axial end thereof.

13. A sealing structure according to claim 8, wherein said wedge means and said control ring together comprise a single ring member having a wedge-shaped cross section.

14. A sealing structure according to claim 8, wherein the layered sealing ring has individual layers having a thickness of between 0.005 and 0.010 inch, and wherein said layered graphite material has a density of between 35 and 90 pounds per cubic foot.

* * * * *